US009303387B2

(12) United States Patent
Pfaff et al.

(10) Patent No.: US 9,303,387 B2
(45) Date of Patent: Apr. 5, 2016

(54) HYDRAULIC SYSTEM WITH OPEN LOOP ELECTROHYDRAULIC PRESSURE COMPENSATION

(71) Applicant: HUSCO International, Inc., Waukesha, WI (US)

(72) Inventors: Joseph L. Pfaff, Wauwatosa, WI (US); Corey K. Quinnell, West Allis, WI (US)

(73) Assignee: HUSCO International, Inc., Waukesha, WI (US)

( * ) Notice: Subject to any disclaimer, the term of this patent is extended or adjusted under 35 U.S.C. 154(b) by 732 days.

(21) Appl. No.: 13/666,260

(22) Filed: Nov. 1, 2012

(65) Prior Publication Data

US 2014/0116038 A1 May 1, 2014

(51) Int. Cl.

| | |
|---|---|
| ***F16D 31/02*** | (2006.01) |
| ***E02F 3/96*** | (2006.01) |
| ***E02F 9/22*** | (2006.01) |
| ***F15B 11/042*** | (2006.01) |

(52) U.S. Cl.

CPC ............... *E02F 3/964* (2013.01); *E02F 9/2228* (2013.01); *E02F 9/2235* (2013.01); *E02F 9/2296* (2013.01); *F15B 11/0423* (2013.01); *F15B 2211/20546* (2013.01); *F15B 2211/40515* (2013.01); *F15B 2211/413* (2013.01); *F15B 2211/41509* (2013.01); *F15B 2211/426* (2013.01); *F15B 2211/50536* (2013.01); *F15B 2211/526* (2013.01); *F15B 2211/605* (2013.01); *F15B 2211/6346* (2013.01); *F15B 2211/6653* (2013.01); *F15B 2211/6654* (2013.01); *F15B 2211/781* (2013.01)

(58) Field of Classification Search

CPC .. F15B 11/0423; F15B 11/161; F15B 11/163; F15B 11/165; F15B 11/166

USPC .................................................... 60/422, 468

See application file for complete search history.

(56) References Cited

U.S. PATENT DOCUMENTS

| | | | | |
|---|---|---|---|---|
| 6,775,974 | B2 * | 8/2004 | Tabor | 60/422 |
| 7,194,855 | B2 * | 3/2007 | Pfaff | 60/368 |
| 7,406,982 | B2 * | 8/2008 | Pfaff et al. | 137/596.17 |
| 2013/0160443 | A1 | 6/2013 | Ballweg et al. | |
| 2013/0220425 | A1 * | 8/2013 | Pomeroy et al. | 60/494 |

FOREIGN PATENT DOCUMENTS

| | | | |
|---|---|---|---|
| EP | 2078868 | A2 | 7/2009 |
| GB | 2500773 | A | 10/2013 |

* cited by examiner

*Primary Examiner* — Michael Leslie
(74) *Attorney, Agent, or Firm* — Quarles & Brady LLP

(57) ABSTRACT

A hydraulic system has a pump that furnishes pressurized fluid to a supply node connected to a plurality of functions. Each function includes hydraulic actuator and a control valve assembly through which fluid flows both from the supply node to the hydraulic actuator and from the hydraulic actuator to a return line. A control method involves receiving a plurality of commands, each designating desired operation of a function. Each command is separately used to derive a flow value designating an amount of flow for the respective function, a load value indicating a load magnitude related to the respective function, and a pressure value denoting a supply pressure for the respective function. Then, the control valve assembly for each given hydraulic function is operated in response to the flow and load values for that function and in response to the pressure value that is greatest among the plurality of functions.

42 Claims, 3 Drawing Sheets

HYDRAULIC SYSTEM WITH OPEN LOOP ELECTROHYDRAULIC PRESSURE COMPENSATION

CROSS-REFERENCE TO RELATED APPLICATION

Not applicable.

STATEMENT CONCERNING FEDERALLY SPONSORED RESEARCH OR DEVELOPMENT

Not applicable.

BACKGROUND OF THE INVENTION

1. Field of the Invention

The present invention relates to hydraulic systems for equipment, such as off-road construction and agricultural vehicles, and more particularly to an apparatus for controlling a variable displacement pump used in such systems and for precisely controlling flow of pressurized fluid to hydraulic actuators on the equipment.

2. Description of the Related Art

With reference to FIG. 1, a backhoe-loader 10 is a common type of earth moving equipment that has backhoe assembly 20 attached to the rear of a tractor 15 and a loader assembly 25 mounted at the front of the tractor. The backhoe assembly 20 comprises boozes 12 with one end moveably coupled to the frame of a tractor 15 and another end to which a dipper 13 is pivotally mounted. A bucket 14 is pivotally attached to a remote end of the dipper 13. The bucket 14 can be replaced with other types of work implements. The boom 14 is raised and lowered with respect to the frame of a tractor 15 by a first hydraulic actuator 16. A second hydraulic actuator 17 causes the dipper to pivot at the remote end of the boom. A third hydraulic actuator 18 causes the bucket 14 to tilt with respect to the dipper 13. A joint 21 enables the entire backhoe assembly 20 to swivel left and right with respect to the rear end of the tractor 15, which motion is referred to as "swing" or "slew". A fourth hydraulic actuator 19 is attached between the frame of the tractor 15 and the boom 12 and provides the drive force for the swinging the backhoe assembly 20.

The loader assembly 25 comprises a load bucket 27 pivotally coupled to the front end of a lift arm 26 that has a rear end pivotally coupled to the tractor 15. A lift hydraulic actuator 28 raises and lowers the lift arm 26 and a load hydraulic actuator 29 pivots the load bucket 27 up and down at the end of the lift arm 26.

In the exemplary backhoe-loader 10, the hydraulic actuators 16-19, 28 and 29 are cylinder-piston assemblies, however, other types of hydraulic actuators, such as a hydraulic motor, can be used in some instances.

The front wheels 24 of the backhoe-loader 10 are steered by another hydraulic actuator, not visible in FIG. 1.

The flow of hydraulic fluid to and from each of the hydraulic actuators 16-19, 28 and 29 is supplied through control valve assemblies that are controlled by a human operator. Each combination of an actuator and a control valve assembly is part of a hydraulic function. The pressurized fluid to drive the hydraulic actuators is supplied by a pump that is driven by the engine 23 on the tractor 15. For greater efficiency, a variable displacement pump often is used to provide the amount of fluid flow required to operate all the hydraulic actuators as commanded at a given time by the operator of the backhoe-loader 10.

Prior hydraulic systems, such as the one described in U.S. Pat. No. 6,098,403, used a load sense (LS) type variable displacement pump. There the pump displacement is controlled by a load sense pressure signal that corresponds to the greatest pressure produced in all the hydraulic actuators in response to the load forces acting on the actuators. As control of hydraulic systems evolved to using computerized controllers, pumps were developed that varied the displacement in response to electrical signals. Such electrically controlled variable displacement control pumps are expensive and not readily available in all capacities and physical sizes required by many types of machines.

Thus there remains a desire to provide a mechanism by which an electrical signal from a hydraulic system controller produces a control signal to vary the flow of a pump.

Another control factor that has to be considered at each function is pressure compensation. Assume that operation of a first function requires supply fluid at a relatively low pressure. In response, the pump is operated to provide the low pressure and the control valve assembly of the hydraulic function is opened accordingly. When a second hydraulic function requiring a significantly greater pressure is activated, the output pressure of the variable displacement pump increases to satisfy the greater pressure demand. The supply fluid at the higher pressure also is applied to the first hydraulic function, which without compensation, results in the flow rate to the hydraulic actuator increasing, thereby resulting in a velocity of the associated hydraulic actuator exceeding the operator's command. To prevent that undesirable effect, the hydraulic functions incorporate a closed loop type pressure compensation valve that responds to a sensed load pressure and the supply pressure. Thus in the above example, the pressure compensation valve reacts to the increase in supply pressure by restricting the fluid flow so that a relatively constant flow occurs to the first hydraulic actuator in spite of supply pressure variation.

SUMMARY OF THE INVENTION

A hydraulic system has a pump that draws fluid from a tank and sends the fluid under pressure through an outlet to a supply node. The system further includes a plurality of hydraulic functions, each comprising a hydraulic actuator and a control valve assembly through which fluid flows from the supply node to the hydraulic actuator and through which fluid flows from the hydraulic actuator to a return line.

The hydraulic system is controlled according to a method that comprises receiving a plurality of commands, each command designating desired operation of a different one of the plurality of hydraulic functions. For each command, a value of that command is employed to derive a function load value designating a load magnitude related to the respective hydraulic function and a function pressure value indicating a level of supply pressure for the respective hydraulic function.

For each given hydraulic function for which a command was received, the associated control valve assembly is operated in response to the function load value for that given hydraulic function and in response to the function pressure value that is greatest among the plurality of hydraulic functions.

In one aspect of the present control method, each command is used to derive a function flow value designating an amount of flow for the control valve assembly of the respective hydraulic function, thereby producing a plurality of function flow values; and wherein operating the associated control valve assembly for the given hydraulic function is also in response to the function flow value for that given hydraulic function.

In another aspect of the present control method, operating the respective control valve assembly for each given hydraulic function comprises deriving a flow coefficient that specifies either a flow restriction or a flow conductance for the given hydraulic function; deriving a level of electric current in response to the flow coefficient; and applying the level of electric current to the associated control valve assembly.

A version of the hydraulic system has a bypass valve that proportionally controls fluid flow from the supply node to the return line. In that case, the method further comprises separately in response to each command, deriving a function bypass value denoting an amount of flow through the bypass valve; and operating the bypass valve in response to one of the function bypass values among all the hydraulic functions. Preferably, the bypass valve is operated by using the smallest function bypass value to derive a flow coefficient which specifies either a flow restriction or a flow conductance for the bypass valve, and then applying a level electric current to the valve in response to the flow coefficient.

The hydraulic system may also include a throttling valve that proportionally controls fluid flow from the pump to the supply node. Yet another aspect of the control method comprises operating the throttling valve in response to summation of the function flow values. Preferably, the throttling valve is operated by using the summation of the function flow values to derive a flow coefficient that specifies either a flow restriction or a flow conductance for the throttling valve, and then applying a level electric current to that valve in response to the flow coefficient.

A further aspect of the present control method allocates fluid to each hydraulic function when the total amount of flow demanded by all the hydraulic functions exceeds the aggregate amount of flow available from the pump.

An embodiment of the control method involves, prior to receiving a plurality of commands, individually characterizing each of the plurality of hydraulic functions by defining separate relationships between variation of a respective command and each of (1) a plurality of magnitudes of the function load value, (2) a plurality of magnitudes of the function pressure value, and (3) a plurality of magnitudes of the function flow value, and (4) a plurality of magnitudes of the function bypass value. Those relationships are used to derive the function load, function pressure, function flow, and function bypass values in response to the command of each hydraulic function.

DETAILED DESCRIPTION OF THE INVENTION

The term "directly connected" as used herein means that the associated components are connected together by a conduit without any intervening element, such as a valve, an orifice or other device, which restricts or controls the flow of fluid beyond the inherent restriction of any conduit. If a component is described as being "directly connected" between two points or elements, that component is directly connected to each such point or element.

The term "hydraulic actuator" as used herein means a device that produces mechanical motion in response to application of pressurized hydraulic fluid, such as for example a cylinder-piston assembly or a hydraulic motor.

Figure 1:
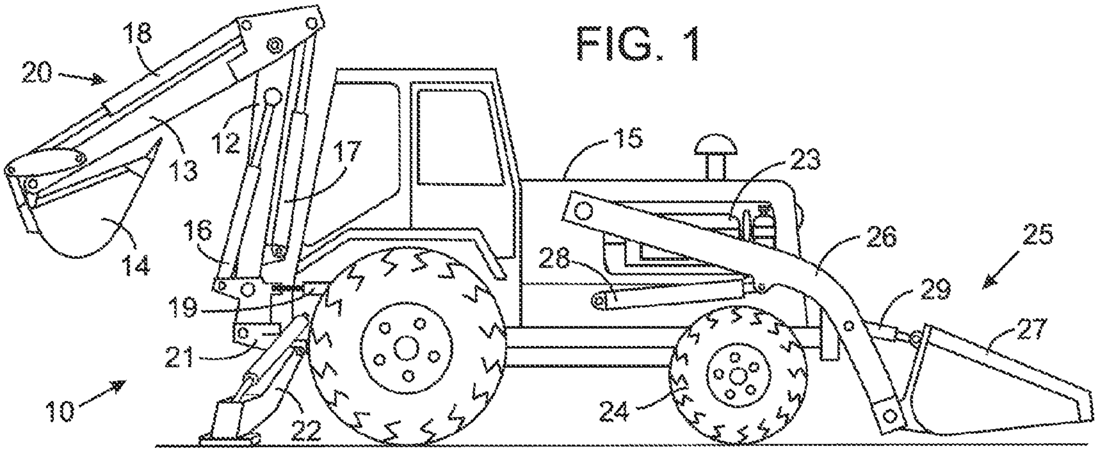
FIG. 1 is a side view of a backhoe-loader.

Although the present invention is being described in the context of use on a backhoe-loader, such as the one shown in FIG. 1, it can be implemented on other hydraulically operated machines.

Figure 2:
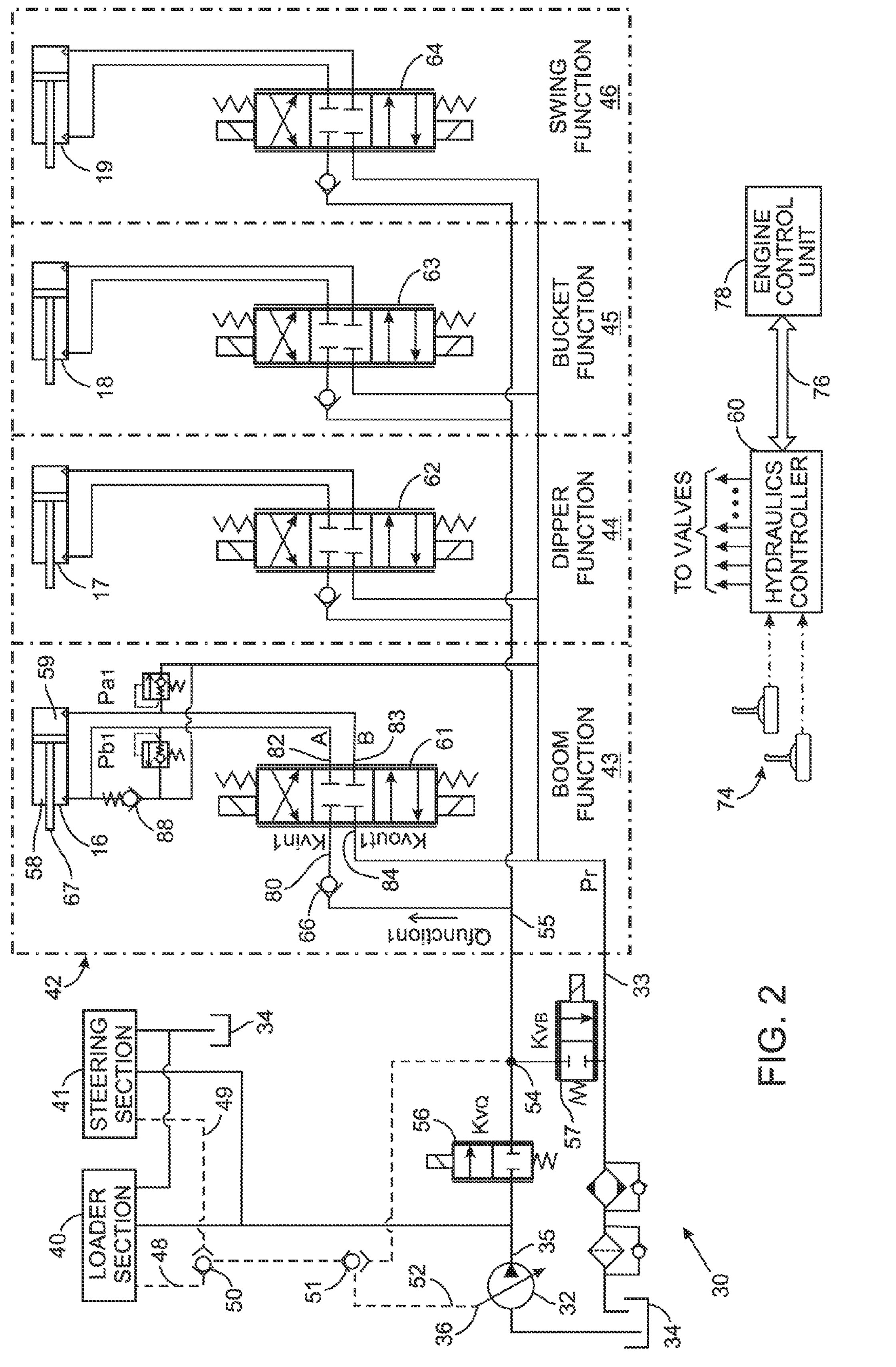
FIG. 2 is a schematic diagram of a hydraulic circuit for the backhoe-loader that incorporates the present invention

With reference to FIG. 2, the hydraulic system 30 for the backhoe-loader 10 has a variable displacement pump 32 that is driven by the engine 23 (FIG. 1). The pump 32 draws fluid from a tank 34 and provides that fluid under pressure to an outlet 35. The displacement of the pump 32 is varied in response to a pressure signal applied to a control input 36 of the pump. The pressure at the pump outlet 35 is the pressure level of the pressure signal plus a fixed amount referred to as a pump margin.

An electrohydraulic, two-position, two-way throttling valve 56 couples the pump outlet 35 to a supply node 54 and proportionally controls fluid flow there between. A two-position, two-way electrohydraulic bypass valve 57 couples the supply node 54 to a tank return line 33 that leads to the tank 34. Both the throttling valve 56 and the bypass valve 57 are operated by electrical signals from a hydraulics controller 60.

The hydraulic system 30 includes the loader section 40, a steering section 41 and a backhoe section 42. The loader section 40 operates the components of the loader assembly 25 and the steering section 41 hydraulically turns the front wheels 24 of the backhoe-loader 10. Both the loader and steering sections 40 and 41 are directly connected to the outlet 35 of the pump 32 and also are connected to return fluid to the tank 34. The backhoe section 42 comprises four hydraulic functions 43-46, each having a hydraulic actuator 16-19 and a control valve assembly 61-64 for controlling the flow of hydraulic fluid to and from the associated hydraulic actuator. The backhoe section 42 receives pressurized fluid from the supply node 54 through a supply line 55.

Each of the loader and steering sections 40 and 41 has a conventional load sense mechanism for controlling the flow of the pump 32. Those load sense mechanisms produce pressure signals on lines 48 and 49 that indicate the pressure caused by forces acting on their respective hydraulic actuator (not shown). A conventional first shuttle valve 50 selects the greater of the pressures in lines 48 and 49 to apply to an input of a second shuttle valve 51. The other input the second shuttle valve 51 is connected to the supply node 54 through which fluid is furnished to the backhoe section 42. An output 52 of the second shuttle valve 51 is connected to the control input 36 of the variable displacement pump 32. The pressure signal applied to the control input 36 of the pump 32 corresponds to the greater of the pressures applied to the two inlets of the second shuttle valve 51. Alternatively, the displacement of the pump can be controlled by an electrical signal from the hydraulics controller 60 in which case that signal would be applied to an electrical control input for the pump.

The backhoe section 42 includes a boom hydraulic function 43, a dipper hydraulic function 44, a bucket hydraulic function 45, and a swing hydraulic function 46. The boom hydraulic function 43 comprises the first hydraulic actuator 16 for raising and lowering the boom 12. The first hydraulic actuator 16 has a rod chamber 58 and a head chamber 59 which are selectively coupled to the supply node 54 and the tank return line 33 by a control valve assembly. The control valve assembly for the boom hydraulic function is a three-position, four-way electrohydraulic first control valve assembly 61 that is operated by signals from the hydraulics controller 60. A conventional load check valve 66 is connected in the connection of the supply line 55 to the inlet of the first control valve assembly 61. In the center position, the first control valve assembly 61 disconnects the first hydraulic actuator 16 from both the supply line 55 and the tank return line 33. In one of the other positions, the head chamber 59 of the first actuator 16 is connected to the supply line 55 and the rod chamber 58 is connected to the tank return line 33. In the third position, the first control valve assembly 61 connects the rod chamber 58 to the supply line 55 and connects the head chamber 59 to the tank return line 33. Which chamber of the first hydraulic actuator 16 is connected to the supply line determines the direction in which that actuator is driven to either extend or retract its piston rod 67.

The dipper, bucket, and swing hydraulic functions 44, 45, and 46 respectively operate the second, third, and fourth hydraulic actuators, 17, 18, and 19. The control valve assemblies 62, 63, and 64 for the dipper, bucket, and swing functions 44, 45, and 46 couple the associated hydraulic actuators 17, 18, and 19 to the supply line 55 and the tank return line 33 in similar manners to that described with respect to the boom hydraulic function 43 and its first control valve assembly 61. Each control valve assembly for the exemplary backhoe-loader 10 is implemented by a three-position, four-way spool valve 61-64 that is electrically operated by signals from the hydraulics controller 60. Other types of electrohydraulic valves and combinations of valves may be used as the control valve assembly.

The hydraulics controller 60 is a microcomputer based circuit which receives input signals from operator input devices, such as joysticks 74. The hydraulics controller 60 may receive other control information via a communication network 76 from other devices, such as engine control unit 78 on the backhoe-loader 10. A software program executed by the hydraulics controller 60 responds to those input signals and information by producing output signals that selectively operate the throttling valve 56, the bypass valve 57, and the four control valve assemblies 61-64, as will be described. The hydraulics controller 60 opens those respective valves to proportionally control the flow of fluid there through so as to properly operate the hydraulic system 30.

Hydraulic System Operational Overview

The nomenclature defined in Table 1 will aid in understanding the present control method, the hydraulic function characteristics, and the operational attributes of the hydraulic system 30 in FIG. 2.

TABLE 1

| HYDRAULIC SYSTEM NOMENCLATURE | |
|---|---|
| a | denotes items related to head chamber of cylinder |
| b | denotes items related to rod chamber of cylinder |
| Aa | piston area in the head cylinder chamber |
| Ab | piston area in the rod cylinder chamber |
| dPload_i | function load force Pa- (Pb/(Aa/Ab)) (function load value) |
| i | a number designating one of the hydraulic functions |
| Khead | flow coefficient of a valve path for fluid flow to or from the head chamber |
| Krod | flow coefficient of a valve path for fluid flow to or from the rod chamber |
| Kvb | a flow coefficient for a bypass valve |
| Kveq | a function equivalent flow coefficient - Khead and Krod combined |
| Kvq | a flow coefficient for a throttling valve |
| Pa | actuator head chamber pressure |
| Pb | actuator rod chamber pressure |
| Pr | tank return line pressure |
| Ps_system | greatest of the Ps_typical_i values for all the hydraulic functions |
| Ps_typical_i | supply pressure required to operate function i alone (pressure value) |
| Qmin | minimum flow required by a machine or a physical stop on the pump |
| Qpump | total pump flow |
| Qbypass | system bypass flow |
| Qbypass_i | target bypass flow for hydraulic function i (function bypass flow value) |
| Qfunction_i | target flow from pump to hydraulic function i (function pump flow value) |
| Qsystem | total target flow from pump to the hydraulic functions |
| Qspeed_i | target flow consumption for hydraulic function i (function flow value) |
| R | cylinder area ratio, Aa/Ab (for R ≥ 1.0) |

An important parameter used by the present hydraulic control technique is a "flow coefficient" which specifies either the resistance or the conductance of a path to the flow of fluid. Thus the degree to which the throttling valve 56 or the bypass valve 57 opens provides a given amount of resistance or conductance to fluid flow through that valve and thus defines a given flow coefficient Kv for the valve at that time. Each of the control valve assemblies 61-64 provides two fluid paths, a first path for fluid flow to or from a head chamber of the associated hydraulic actuator and a second path for fluid flow from the hydraulic actuator's rod chamber. Therefore, the degree to which a control valve assembly opens, defines one flow coefficient Khead for the first path and another flow coefficient Krod for the second path. Each control valve assembly also has an equivalent flow coefficient Kveq that specifies the combined effects that Khead and Krod have on fluid flow in and out of the respective hydraulic actuator.

The present technique for controlling the pump flow and the operation of each hydraulic function is based on previously defined data that characterized typical operating parameters for the hydraulic functions of the backhoe-loader 10. The relationships between operator commands for a given hydraulic function and the value for each of those operating parameters is defined, either theoretically or empirically, during the design phase of the particular machine, e.g., backhoe-loader 10.

The operating characteristics for each hydraulic function is individually determined by:

a) Quantifying the pump flow (Qpump), the function inlet flow (Qfunction_i), and the function flow consumption (Qspeed);
b) Quantifying the typical actuator loads, the typical supply pressure required;
c) Designing inlet and outlet metering flow restrictions necessary to satisfy the above requirements; and
d) Calculating a combined function flow coefficient for each control valve assembly position.

The operating characteristics for the hydraulic functions are used in a control algorithm implemented by the hydraulics controller 60 to govern the operation of the hydraulic system 30.

During the system operation, upon receiving an operator command for one or more of the hydraulic functions, the hydraulics controller 60:

1) Operates the bypass valve 57 in response to the minimum of bypass flows commanded and an expected highest pressure load on the machine;
2) Operates the throttling valve 56 based on all operator function commands and the desired level of bypass valve flow; and
3) Operates each function control valve assembly 61-64 based on the associated operator command, a typical load for that function, and an expected highest pressure function on the machine.

Hydraulic Function Characterization

In order for the controller to implement the present control technique, the operating characteristics of the each hydraulic function 43-46 and its respective control valve assembly need to be known. Those characteristics are defined as part of the hydraulic system design process which is similar to that previously used with respect to designing conventional open center control valves. The control valve assemblies are designed in a conventional manner based on the flow levels required to operate the associated hydraulic actuator and a desired relationship of the range of the user input signals, or commands, from the joystick to values for certain operating parameters of the respective hydraulic function. During subsequent operation of the machine, those relationships are used to convert each input command into specific values for those operating parameters. The operating parameter values then are used by the software executed in the hydraulics controller 60 to operate the control valve assembly for the hydraulic function being commanded, as will be described.

Each control valve assembly 61-64 may be an electrohydraulic spool valve in which a common spool meters the flows of fluid in both directions to and from the associated hydraulic actuator, i.e., a meter-in, meter-out valve. Although the control valve assemblies 61-64 do not have an open center, the valve design principles for the present system are very similar to those conventionally employed to design a hydraulic system that has open-center control valve assemblies. As will be described, the bypass flow through the open centers of such valves is provided by operating the single bypass valve 57 in FIG. 2.

One step in the characterization process for a particular hydraulic function is to define the required fluid flows when only that function is active. This involves deriving the relationships between the range of joystick commands for the particular hydraulic function (i) and (1) an amount of flow consumption (Qspeed_i) for the associated hydraulic actuator to operate as commanded, (2) an amount of flow (Qfunction_i) that the function requires from the pump, and (3) an amount of flow (Qbypass_i) that should pass through the bypass valve 57. The relationships of these parameters may be calculated from design data for the backhoe-loader 10, or other machine being developed, or produced empirically from actual operating data from a prototype machine hydraulic system.

Figure 3:
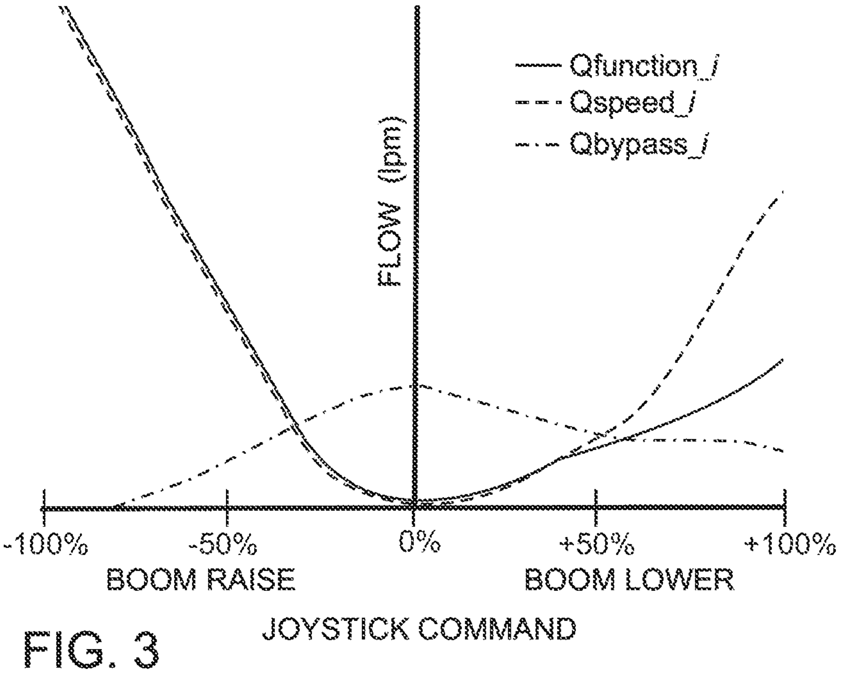
FIG. 3 is a graph showing relationships between a user joystick command and several fluid flow characteristics of an exemplary hydraulic function.

Examples of these parameter relationships for the boom hydraulic function 43 are depicted by the graph in FIG. 3. Observe that the amount of flow, designated as the function bypass flow value (Qbypass_i), for the bypass valve 57 is non-zero throughout most of the range of joystick commands and has the greatest flow level when the hydraulic function is inactive, that is when the joystick command is zero.

A function flow parameter corresponds to a target flow consumption into a given hydraulic function in order to operate the associated hydraulic actuator as designated by the joystick command. The relationship between the value for this parameter, designated a function flow value Qspeed_i, and the joystick command, as plotted in FIG. 3, defines how the associated control valve assembly 61-64 needs to operate. Understand that for some hydraulic functions under certain conditions, the amount of flow consumption Qspeed_i does not have to be provided by the pump 32. For example, the boom hydraulic function 43 during lowering can be driven not by fluid from the pump, but by the force of gravity acting on the boom 12. In that instance, gravity forces fluid out the head chamber of the boom cylinder 16 and fluid required to fill the expanding rod chamber can be provided either by regeneration or through an anticavition valve 88 (FIG. 2). Thus during boom lowering, the function flow value Qspeed_i is greater than the amount of fluid required from the pump, designated by a function pump flow value (Qfunction_i) and indicated graphically in FIG. 3. Thus for the boom hydraulic function 43 the function flow value Qspeed_i is used to operate the control valve assembly 61 and the different function pump flow value Qfunction_i is used to control the throttling valve 56 that governs the flow from the pump 32. For some hydraulic functions that are not significantly affected by the force of gravity, such as the bucket and swing hydraulic functions 45-46, the target function flow values Qspeed_i and the target function pump flow values Qfunction_i are identical.

The relationships between the joystick commands and each of Qbypass_i, Qspeed_i, and Qfunction_i are based on operator preferences regarding the performance of the various hydraulic functions. The different values for each of those parameters with respect to the range of joystick commands for a given hydraulic function can be stored in separate look-up tables. Thus each look-up table defines a relationship between a value of the joystick command and a value for the respective parameter, Qspeed_i, Qfunction_i, or Qbypass_i. These and other lookup tables produced during hydraulic function characterization are eventually stored in the memory of the hydraulics controller 60 on the backhoe-loader 10.

Figure 4:
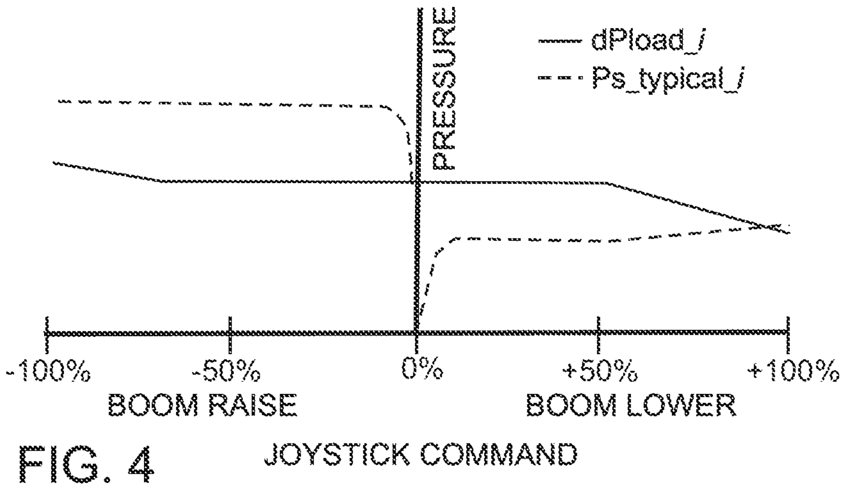
FIG. 4 is a graph depicting relationships between a user joystick command and pressure parameters of the exemplary hydraulic function.

A function load parameter dPload_i describes the typical load acting on the hydraulic actuator at different velocities as commanded by the associated joystick 74. The value of that parameter, referred to herein as a "function load value," is not constant for all the joystick commands and thus the relationship between the full range of joystick commands and the function load values for dPload_i is characterized. An example of the relationship between the joystick position and the function load value for the boom hydraulic function is depicted graphically in FIG. 4.

That figure also depicts another relationship between the joystick command and pressure required at the supply node 54 to be able to drive the associated hydraulic actuator being commanded. That required pressure level at the control valve input for a particular hydraulic function i is designated Ps_typical_i and is referred to herein as a "function pressure value." The relationships between the joystick commands and the dPload_i and Ps_typical_i values for the given hydraulic function can be stored as a set of values in two additional look-up tables. Thus each look-up table defines a relationship between a value of the joystick command and a value for the respective parameter, dPload_i or Ps_typical_i. Although look-up tables are described as being used to implement the present control method, other techniques, such as solving an arithmetic expression, can be employed to derive a value for a particular parameter from the joystick command.

Figure 5:
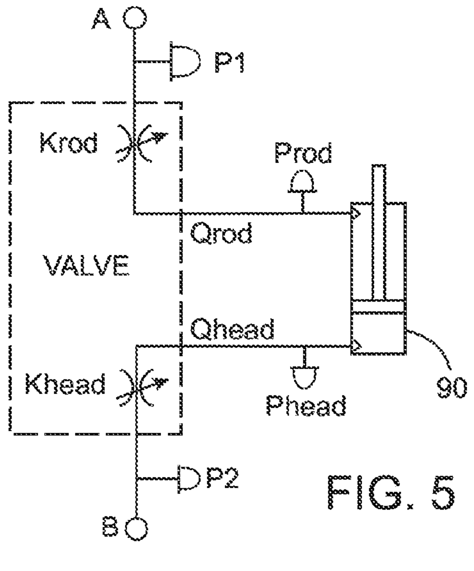
FIG. 5 depicts a test setup used to characterized flow parameters of a valve.

The control valve characteristics are determined, such as by using a test setup as shown in FIG. 5, in which a supply line and a return line are connected to nodes A and B depending upon the direction that the hydraulic actuator 90 is to move. P1 is the pressure measured at node A, Prod is the pressure measured at the workport of the valve that is connected to the rod chamber of the hydraulic actuator, and Qrod is the flow to or from the rod chamber. P2 is the pressure at node B of the test setup, Phead is pressure at another workport to which the head chamber is connected, and Qhead is the flow to or from the head chamber. These parameters are measured during operation of the valve through the entire range of openings.

A first flow coefficient, Krod, specifying a restriction that the valve provides to fluid flowing to or from the rod chamber of the hydraulic actuator 90, is derived by the expression:

$$Krod = \frac{|Qrod|}{\sqrt{|P1 - Prod|}} \tag{1}$$

Another flow coefficient Khead, specifying a restriction of the valve to fluid flowing to or from the head chamber, is derived using the expression:

$$Khead = \frac{|Qhead|}{\sqrt{|P2 - Phead|}} \tag{2}$$

Those two flow coefficients then are mathematically combined to produce an equivalent flow coefficient for the valve denoting the combined fluid restrictions of the respective hydraulic function. The equivalent flow coefficient (Kveq) is given by:

$$Kveq = \sqrt{\frac{Khead^2 * Krod^2}{Khead^2 + R^3 Krod^2}} \tag{3}$$

where R is a ratio of the piston area in a head chamber of the hydraulic actuator 90 to the piston area in a rod chamber. The values of Kveq for the range of joystick commands then are mapped to electric current levels required to position the valve in order to achieve the desired hydraulic function motion as indicated by the joystick signal.

A person skilled in hydraulic technology will recognize that in place of flow restriction coefficients, the inversely related flow conductance coefficients can be used to characterize the fluid flow.

The above described characterization process is performed for every hydraulic function 43-46 and the resulting characteristics may be stored in lookup tables for use in operating the hydraulic system 30 and the backhoe-loader 10.

System Operation

During operation of the backhoe-loader 10, the operator manipulates the joysticks 74 to command operation of the various hydraulic functions 43-46 that thereby move the associated components on the machine. As is commonplace, each axis of the joysticks controls a different hydraulic function. The direction and amount that a joystick is moved along that axis respectively designates the direction and speed (i.e. cumulatively velocity) at which the hydraulic actuator for the associated hydraulic function is desired to move. The exemplary hydraulic actuators 16-19 can operate to extend or retract the piston rod.

The joystick signal for each hydraulic function 43-46 provides a command that is processed by the hydraulics controller 60 to produce an electrical current level for operating the control valve assembly 61-64 for that function. That command corresponds to the amount which the joystick has been moved by the human operator and is used to derive the function flow value Qspeed_i for operating the associated control valve to drive the related hydraulic actuator at the commanded velocity. The value of the joystick command is used to access a lookup table stored in the hydraulics controller memory and obtain the corresponding function flow value Qspeed_i according to the relationship defined during the characterization phase. That look-up process using the joystick command is employed with the other stored data tables to obtain a function pump flow value for Qfunction_i, a function load valve for dPload_i, and a function bypass flow value for Qbypass_i. That specified bypass valve flow amount is similar to that which would occur if a conventional open-center control valve assembly was used for this hydraulic function. As mentioned previously, the bypass flow has a non-zero value throughout most of the range of joystick commands. A function pressure value Ps_typical_i for the supply pressure, required by the hydraulic function to move the associated hydraulic actuator and overcome the load force, is obtained in a similar manner using the value of the joystick command.

The above steps are repeated to obtain a set of values for Qbypass_i, Qspeed_i, Qfunction_i, dPload_i, and Ps_typical_i for every one of the hydraulic functions 43-46.

Then, the desired total output flow (Qpump) from the pump 32 is calculated by combining the sum of all the individual function pump flow values for Qfunction_i with the smallest of the function bypass values, or flows, for Qbypass_i, specified for all the hydraulic functions 43-46. That smallest function bypass value, i.e., the smallest bypass flow, also is selected as the flow amount Qbypass to pass through the bypass valve 57. These computations are given by the equations:

$$Q\text{bypass} = \text{MIN}_{i=1}^{n}\{Q\text{bypass\_}i\} \tag{4}$$

$$Q\text{system} = \Sigma_{i=1}^{n} Q\text{function\_}i \tag{5}$$

$$Q\text{pump} = \text{MAX}\{Q\text{min}, Q\text{system} + Q\text{bypass}\} \tag{6}$$

where Qmin is the minimum flow required by the machine, such as for cooling and filtration, or the smallest flow level set by a physical stop on the pump 32. In some situations, such as for functions that are not significantly affected by gravity, Qspeed_i, can be used in equation (5) in place of Qfunction_i.

Operation of the backhoe-loader 10 and other machines often requires that multiple hydraulic functions must operate simultaneously. In some cases, the total amount of fluid flow being demanded by all those active hydraulic functions exceeds the maximum flow that the pump is capable of producing. At such times, it is desirable that the control system allocate the available hydraulic fluid among the active functions in an equitable or predefined manner, so that one function does not consume a disproportionate amount of the available hydraulic fluid flow. This allocation technique is commonly referred to as "flow sharing".

To implement flow sharing, a displacement limited flow constraint and a power limited flow constraint are calculated. The displacement limited flow constraint (Qdispl_max) is derived based on the pump flow and speed of the engine 23 that drives the pump 32. For example, that derivation can use the following equation:

$$Q\text{displ\_max} = K1 * \text{Pump\_displ} * \text{Engine\_speed} \tag{7}$$

where Pump_disp is the displacement of the pump in cubic centimeters per revolution, Engine_speed is the speed of the engine in revolutions per minute, and K1 is a measurement units conversion factor.

The power limited flow constraint can be derived using the equation:

$$\text{Qpower\_max} = \frac{K2 * \text{Pump\_power}}{\text{Ps\_system} + Pmargin} \quad (8)$$

where Pump_power is the power in kilowatts available from the engine 23 for driving the pump 32, Ps_system is the greatest value of Ps_typical_i among all the hydraulic functions, where Pmargin is the conventional pressure margin of the pump 32, and K2 is a measurement units conversion factor.

The displacement limited flow constraint and a power limited flow constraint are then used to calculate maximum flow output available from the pump (Qpump_max) according to the equation:

$$Q\text{pump\_max}=\text{MIN}\{Q\text{displ\_max},Q\text{power\_max}\} \quad (9)$$

then a flow sharing value (Flow_share) is calculated, such as using the equation:

$$\text{Flow\_share}=\text{MAX}\{0,\text{MIN}\{1,Q\text{pump\_max}/Q\text{pump}\}\} \quad (10)$$

The flow sharing value then is employed to determine how to operate the control valve assemblies for each of the active hydraulic functions.

In order to operate the throttling valve, its valve coefficient is first calculated by the equation:

$$Kvq = \frac{Qpump * \text{Flow\_share}}{\sqrt{Pmargin}} \quad (11)$$

If flow sharing is not required in the hydraulic system, that term can be eliminated from this equation. The resulting value of the throttling valve coefficient Kvq is converted into an electrical current level to open the throttling valve 56 the proportional amount to achieve the desired flow from the pump outlet 35 to the supply node 54 and thus the supply line 55. The relationship of the valve coefficient to the electrical current level was defined during characterization of the throttling valve. A lookup table stored in the memory of the hydraulics controller 60 can be employed to convert the throttling valve coefficient into a value that designates the level of electric current to apply to the throttling valve 56. The throttling valve 56 is opened proportionally to a greater amount as the total amount of flow required to operate all the hydraulic functions increases. When none of the hydraulic functions 43-46 is active, there still is a small amount of flow through the throttling valve 56, that is equal to the Qmin.

The valve coefficient for operating the bypass valve 57 is calculated using the equations:

$$\text{Ps\_system} = \text{MAX}_{i=1}^{n}\{\text{Ps\_typical\_i}\} \quad (12)$$

$$Kvb = \frac{Qbypass * \text{Flow\_share}}{\sqrt{\text{Ps\_system} - Pr}} \quad (13)$$

where Pr is the actual or assumed pressure in the return line 33. If flow sharing is not required in the hydraulic system, the Flow_share term can be eliminated from this equation. The value of the bypass valve coefficient Kvb is converted into an electrical current level to open the bypass valve 57 to the required degree. Another lookup table can be used for that conversion. The bypass valve 57 is opened fully when none of the hydraulic functions 43-46 is active and may close at least partially when one or more of the hydraulic function becomes active requiring flow from the pump 32.

Whenever a joystick command is non-zero, the equivalent flow coefficient Kveq_i is periodically calculated for each hydraulic function 43-46, even for those functions for which the joystick command did not change. That way the non-changing active functions are adjusted for effects due to changes in the values of Ps_system and Flow_share resulting from the hydraulic function. Thus pressure compensation and flow sharing are provided for all the hydraulic functions.

The calculation of the equivalent flow coefficient for one hydraulic function will be described with similar calculations being performed for the other functions. If the associated hydraulic actuator is to be extended, as indicated by the velocity command from the joysticks 74, the equivalent flow coefficient Kveq_i is derived by the equation:

$$\text{Kveq\_i} = \frac{\text{Qspeed\_i}/R * \text{Flow\_share}}{\sqrt{R * (\text{Ps\_system} - \text{dPload\_i}) - Pr}} \quad (14)$$

If the associated hydraulic actuator is to be retracted, the valve coefficient is derived according to the equation:

$$\text{Kveq\_i} = \frac{\text{Qspeed\_i} * \text{Flow\_share}}{\sqrt{\text{Ps\_system} + R * (\text{dPload\_i} - Pr)}} \quad (15)$$

If flow sharing is not required in the hydraulic system, that term can be eliminated from this equation. The equivalent flow coefficient Kveq_i is converted into an electrical current level to open the respective control valve assembly 61-64 the corresponding amount. Another lookup table can be used for that conversion. The hydraulics controller then uses the determined electric current values for each of the valves to generate and apply the designated electric current levels to the valves.

For example, the opening movement of the first control valve assembly 61 in either direction from the center position connects its inlet 80 through an internal variable metering orifice to one of the workports 82 or 83 depending upon the direction of that motion. That motion also connects the other workport 83 or 82 to the outlet port 84 coupled to the tank return line 33. The amount that the first control valve assembly 61 moves from the center position controls the flow of fluid to and from the first hydraulic actuator 16 in the boom hydraulic function 43. As noted, other control valve assemblies may be opened simultaneously a similar manner in response to different joystick signals.

At the same time, that one or more of the control valve assemblies 61-64 opens, the proportional throttling valve 56 opens by an amount defined by the throttling valve coefficient Kvq. That amount is related to the combined commanded flows desired through all the control valve assemblies. Simultaneously, the bypass valve 57 is modulated by an amount that is defined by the bypass valve coefficient Kvb and that is related to the smallest commanded flow desired from the operator commands. Thus as the first control valve assembly 61 opens, the path through which fluid is supplied from the pump outlet 35 to the supply node 54 increases, while flow through bypass valve 57 from the supply node to the tank return line 33 decreases, thereby causing the pressure at the supply node 54 to increase.

That supply node pressure is communicated to an inlet of the second shuttle valve 51. If that pressure is greater than the load sense pressure from the outlet of the first shuttle valve 50, the supply node pressure is applied to the control input 36 of the pump 32. This causes an increase in the output flow of the pump 32 in order to maintain the "pump margin". Thus the flow of fluid into the supply line 55 increases to meet the operating demands of all the active hydraulic functions When the first hydraulic actuator 16 reaches the desired position, the operator commands that first control valve assembly 61 be returned to the center position. Upon reaching the center position, the two workports 82 and 83 are closed again, cutting off fluid flow from the flow supply line 55 to the first hydraulic actuator 16 and flow from that actuator to the tank return line 33. This is accomplished by the hydraulics controller 60 recalculating a zero value for the equivalent restriction coefficient (Kveq_i) of the boom hydraulic function 43, which results in no electric current being applied to the first control valve assembly 61. The hydraulics controller 60 also responds to the operator command, by moving the throttling valve 56 toward the closed position which reduces the flow from the pump 32 to the supply node 54. The amount of that closure depends on whether other hydraulic functions are active and demanding fluid. If the first function was the only one that was active, the bypass valve 57 is opened farther to enlarge the flow path to the tank return line 33. The amounts that the throttling valve remains open and the size to which the bypass valve 57 opens depends on whether any other hydraulic functions still are active and the flow requirements of such active functions. If all the control valve assemblies 61-64 are in the neutral, center position, the throttling valve 56 is closed to a minimum position defined by Qmin and the bypass valve 57 is opened fully. These changes in the throttling valve 56 and the bypass valve 57 affect the pressure at the supply node 54 and the displacement of the pump 32 if that pressure is applied via the second shuttle valve 51 to the pump control input 36.

As described previously herein for existing compensated systems, the output pressure of the pump 32 is set to satisfy the greatest load force acting on the four hydraulic actuators 16-19. Thus the resultant pressure in the supply line 55 may be significantly greater than the pressure level required for another function that has a much smaller load. As a consequence, a pressure compensator previously was incorporated in each hydraulic function to maintain a preset pressure differential across the control valve assembly to minimize the influence of pressure variation on the flow rate of fluid passing through the control valve assembly to the associated hydraulic actuator.

The present hydraulic system does not require such pressure compensators. Instead, the calculation, according to equations (14) and (15), of each function's equivalent flow coefficient Kveq_i used to operate the associated control valve assembly, depends on the function pressure value for Ps_typical_i that is the greatest among all the hydraulic functions, i.e., the value designated Ps_system. Thus operation of the control valve assemblies for every function implements pressure compensation using the unique parameters and control process described above.

The foregoing description was primarily directed to a preferred embodiment of the invention. Although some attention was given to various alternatives within the scope of the invention, it is anticipated that one skilled in the art will likely realize additional alternatives that are now apparent from disclosure of embodiments of the invention. Accordingly, the scope of the invention should be determined from the following claims and not limited by the above disclosure.

What is claimed is:

1. A method for operating a hydraulic system having a pump, a return line, a supply node that receives pressurized fluid from the pump, and a plurality of hydraulic functions, each hydraulic function including a hydraulic actuator and a control valve assembly through which fluid flows from the supply node to the hydraulic actuator, said method comprising:

receiving a plurality of commands, each designating desired operation of a different one of the plurality of hydraulic functions;

for each command, employing that command to derive a function load value designating a load magnitude related to the respective hydraulic function and a function pressure value indicating a level of supply fluid pressure for the respective hydraulic function; and for each given hydraulic function for which a command was received, operating the associated control valve assembly for the given hydraulic function in response to the function load value for that given hydraulic function and in response to the function pressure value that is greatest among the plurality of hydraulic functions.

2. The method as recited in claim 1 wherein operating the respective control valve assembly for each given hydraulic function comprises deriving a flow coefficient that specifies one of a flow restriction and a flow conductance for the given hydraulic function; deriving a level of electric current in response to the flow coefficient; and applying the level of electric current to the respective control valve assembly.

3. The method as recited in claim 1 further comprising for each command, employing that command to derive a function flow value designating an amount of flow for the respective hydraulic function, thereby producing a plurality of function flow values; and wherein operating the associated control valve assembly for the given hydraulic function is also in response to the function flow value for that given hydraulic function.

4. The method as recited in claim 3 further comprising prior to receiving the plurality of commands, individually characterizing each of the plurality of hydraulic functions by defining separate relationships between each of (1) a plurality of magnitudes of the function load value, (2) a plurality of magnitudes of the function pressure value, and (3) a plurality of magnitudes of the function flow value and a range of commands for each of the plurality of hydraulic functions.

5. The method as recited in claim 3 wherein operating the respective control valve assembly for each given hydraulic function comprises deriving a flow coefficient that specifies one of a flow restriction and a flow conductance for the given hydraulic function; deriving a level of electric current in response to the flow coefficient; and applying the level of electric current to the respective control valve assembly.

6. The method as recited in claim 3 further comprising deriving a flow sharing value that designates a relationship between a total amount of flow demanded by the plurality of hydraulic functions and an amount of flow available from the pump.

7. The method as recited in claim 6 wherein operating the control valve assembly of each hydraulic function is also in response to the flow sharing value.

8. The method as recited in claim 6 wherein operating the respective control valve assembly for a given hydraulic function comprises:

deriving a flow coefficient Kveq_i that specifies one of a flow restriction and a flow conductance for the given hydraulic function, wherein that deriving employs one of the following equations depending on a direction that the given hydraulic function is commanded to move:

$$Kveq\_i = \frac{Qspeed\_i / R * Flow\_share}{\sqrt{R * (Ps\_system - dPload\_i) - Pr}}$$

and $$Kveq\_i = \frac{Qspeed\_i * Flow\_share}{\sqrt{Ps\_system + R * (dPload\_i - Pr)}}$$

where dPload_i is the function load value for the given hydraulic function, Ps_system is the function pressure value which is greatest among all the hydraulic functions, Qspeed_i is the function flow value for the given hydraulic function, Flow_share is the flow sharing value, R is the ratio of a piston area in a head chamber of the hydraulic actuator of the given hydraulic function to another piston area in a rod chamber, and Pr is pressure in the return line; and in response to the flow coefficient Kveq_i, applying a level of electric current to the control valve assembly based on the given hydraulic function.

9. The method as recited in claim 3 in which the hydraulic system further includes a throttling valve that proportionally controls fluid flow from the pump to the supply node, and wherein the method further comprises operating the throttling valve in response to the plurality of function flow values.

10. The method as recited in claim 9 wherein operating the throttling valve comprises using a summation of the function flow values to derive a flow coefficient that specifies one of a flow restriction and a flow conductance for the throttling valve.

11. The method as recited in claim 9 further comprising applying pressure at the supply node to a displacement control input of the pump.

12. The method as recited in claim 1 in which the hydraulic system further includes a throttling valve that proportionally controls fluid flow from the pump to the supply node; and further comprising for each command, employing that command to derive a function pump flow value designating an amount of flow that the respective hydraulic function requires from the pump, thereby producing a plurality of function pump flow values; and further comprising operating the throttling valve in response to the plurality of function pump flow values.

13. The method as recited in claim 12 wherein operating the throttling valve comprises using a summation of the function pump flow values to derive a flow coefficient that specifies one of a flow restriction and a flow conductance for the throttling valve.

14. The method as recited in claim 13 wherein operating the throttling valve further comprises, in response to the flow coefficient, producing a level of electric current for operating the throttling valve.

15. The method as in claim 12 wherein operating the throttling valve comprises:

deriving a flow sharing value that designates a relationship between a total amount of flow demanded by the plurality of hydraulic functions and an amount of flow available from the pump;

deriving a flow coefficient Kvq according to the equation:

$$Kvq = \frac{Qpump * Flow\_share}{\sqrt{Pmargin}}$$

where Qpump is a value produced by a summation of the function pump flow values for all the plurality of hydraulic functions that are active, Flow_share is the flow sharing value, and Pmargin is a value denoting a margin of the pump; and applying a level of electric current to the throttling valve in response to the flow coefficient Kvq.

16. The method as recited in claim 12 in which the hydraulic system further includes a bypass valve that proportionally controls fluid flow from the supply node to the return line bypassing the plurality of hydraulic functions; wherein the method comprises separately in response to each command, deriving a function bypass value denoting an amount of flow through the bypass valve; and operating the bypass valve in response to a selected function bypass value.

17. The method as recited in claim 16 wherein operating the bypass valve comprises using the selected function bypass value to derive a flow coefficient that specifies one of a flow restriction and a flow conductance for the bypass valve.

18. The method as recited in claim 16 wherein operating the throttling valve comprises using a sum of the function bypass value which is smallest and a summation of the function pump flow values to derive a flow coefficient that specifies one of a flow restriction and a flow conductance for the throttling valve.

19. The method as recited in claim 16 further comprising prior to receiving a plurality of commands, individually characterizing each of the plurality of hydraulic functions by defining relationships of variation of a respective command to each of (1) a plurality of magnitudes of the function load value, (2) a plurality of magnitudes of the function pressure value, and (3) a plurality of magnitudes of the function pump flow value, and (4) a plurality of magnitudes of the function bypass value.

20. The method as recited in claim 1 further comprising for each command, employing that command to derive a function pump flow value designating an amount of flow that the respective hydraulic function requires from the pump, thereby producing a plurality of function pump flow values; and varying fluid flow from the pump in response to the plurality of function pump flow values.

21. The method as recited in claim 20 wherein the hydraulic system further includes a bypass valve that proportionally controls fluid flow from the supply node to the return line bypassing the plurality of hydraulic functions, wherein the method comprises:

separately in response to each command, deriving a function bypass value denoting an amount of flow through the bypass valve; and operating the bypass valve in response to a selected one of the function bypass values.

22. The method as recited in claim 21 wherein operating the bypass valve comprises using the selected one of the function bypass values to derive a flow coefficient that specifies one of a flow restriction and a flow conductance for the bypass valve.

23. The method as recited in claim 22 wherein operating the bypass valve further comprises, in response to the flow coefficient, producing a level of electric current for operating the bypass valve.

24. The method as recited in claim 21 further comprising:

deriving a flow sharing value that designates a relationship between a total amount of flow demanded by the plurality of hydraulic functions and an amount of flow available from the pump;

deriving a flow coefficient Kvb according to the equation:

$$Kvb = \frac{Qbypass * \text{Flow\_share}}{\sqrt{\text{Ps\_system} - Pr}}$$

where Qbypass is a value corresponding to the function bypass value which is smallest among all the hydraulic functions, and Ps_system is the function pressure value which is greatest among all the hydraulic functions, Flow_share is the flow sharing value, and Pr is pressure in the return line; and applying a level of electric current to the bypass valve in response to the flow coefficient Kvb.

25. A method for operating a hydraulic system having a pump, a supply node that receives pressurized fluid from the pump, and a plurality of hydraulic functions, each hydraulic function including a hydraulic actuator and a control valve assembly through which fluid flows from the supply node to the hydraulic actuator and through which fluid flows from the hydraulic actuator to a return line, said method comprising:

for each of the plurality of hydraulic functions, defining separate relationships between each of (1) amounts of flow for that hydraulic function, (2) magnitudes of a load related to that hydraulic function, and (3) magnitudes of a level of supply pressure for that hydraulic function and a range of commands for that hydraulic function;

thereafter:

receiving a plurality of commands, each command designating desired operation of a different one of the plurality of hydraulic functions;

separately in response to each command, employing a value of that command and the relationships to derive a function flow value designating an amount of flow for the respective hydraulic function, a function load value indicating a load magnitude related to the respective hydraulic function, and a function pressure value denoting a level of supply pressure for the respective hydraulic function, thereby producing a plurality of function flow values, function load values, and function pressure values; and for each given hydraulic function for which a command was received, operating the control valve assembly for the given hydraulic function in response to the function flow value and the function load value for that given hydraulic function and in response to the function pressure value that is greatest among the plurality of hydraulic functions.

26. The method as recited in claim 25 wherein operating the respective control valve assembly for each given hydraulic function comprises deriving a flow coefficient that specifies one of a flow restriction and a flow conductance for the given hydraulic function; deriving a level of electric current in response to the flow coefficient; and applying the level of electric current to the respective control valve assembly.

27. The method as recited in claim 26 further comprising deriving a flow sharing value that designates a relationship between a total amount of flow demanded by the plurality of hydraulic functions and an amount of flow available from the pump; and wherein each flow coefficient also is derived in response to the flow sharing value.

28. The method as recited in claim 25 wherein the hydraulic system further includes a throttling valve that proportionally controls fluid flow from the pump to the supply node, and a bypass valve that proportionally controls fluid flow from the supply node to the return line, wherein the method comprises:

separately in response to each command, deriving a function bypass value denoting an amount of flow through the bypass valve;

operating the bypass valve in response to the function bypass value which is smallest; and operating the throttling valve in response to a summation of the plurality of function flow values.

29. The method as recited in claim 28 wherein operating the bypass valve comprises using the function bypass value which is smallest to derive a flow coefficient that specifies one of a flow restriction and a flow conductance for the bypass valve; and in response to the flow coefficient, producing a level of electric current for operating the bypass valve.

30. The method as recited in claim 28 wherein operating the throttling valve comprises using the summation of the function flow values to derive a flow coefficient that specifies one of a flow restriction and a flow conductance for the throttling valve; and in response to the flow coefficient, producing a level of electric current for operating the throttling valve.

31. The method as recited in claim 28 wherein the pump has a displacement that varies in response to pressure applied to a control input, and further comprising applying pressure at the supply node to the control input.

32. The method as recited in claim 25 further comprising for each command that is received, employing that command to derive a function pump flow value designating an amount of flow that the respective hydraulic function requires from the pump, thereby producing a plurality of function pump flow values; and varying fluid flow from the pump in response to the plurality of function pump flow values.

33. A method for operating a hydraulic system having a pump, a throttling valve that proportionally controls fluid flow from the pump to a supply node, and a plurality of hydraulic functions each including a hydraulic actuator and a control valve assembly through which fluid flows from the supply node to the hydraulic actuator and through which fluid flows from the hydraulic actuator to a return line, the hydraulic system also having a bypass valve that proportionally controls fluid flow from the supply node to the return line bypassing the plurality of hydraulic functions, said method comprising:

receiving a plurality of commands, each command designating desired operation of a different one of the plurality of hydraulic functions;

separately in response to each command, employing a value of that command to derive a function flow value designating an amount of flow for the respective hydraulic function, a function load value indicating a load magnitude related to the respective hydraulic function, a function pressure value denoting a level of supply pressure for the respective hydraulic function, and a function bypass value denoting an amount of flow for the bypass valve, thereby producing a plurality of function flow values, function load values, function pressure values and function bypass values;

operating the bypass valve in response to the function bypass value that is smallest;

operating the throttling valve in response to a summation of the plurality of function flow values; and for each given hydraulic function for which a command was received, operating the respective control valve assembly in response to the function flow value and the function load value for that given hydraulic function.

34. The method as recited in claim 33 further comprising prior to receiving the plurality of commands, individually characterizing each of the plurality of hydraulic functions by defining separate relationships between each of (1) a plurality of magnitudes of the function flow value, (2) a plurality of magnitudes of the function load value, (3) a plurality of magnitudes of the function pressure value, and (4) a plurality of magnitudes of the function bypass value and a range of commands for each of the plurality of hydraulic functions.

35. The method as recited in claim 32 wherein operating the bypass valve comprises using the function bypass value which is smallest to derive a flow coefficient that specifies one of a flow restriction and a flow conductance for the bypass valve.

36. The method as recited in claim 35 wherein operating the bypass valve further comprises using the flow coefficient to produce a level of electric current for operating the bypass valve.

37. The method as recited in claim 33 wherein operating the throttling valve comprises using the summation of the function flow values to derive a flow coefficient that specifies one of a flow restriction and a flow conductance for the throttling valve.

38. The method as recited in claim 33 wherein operating the throttling valve comprises using a sum of the function bypass value which is smallest and the summation of the function flow values to derive a flow coefficient that specifies one of a flow restriction and a flow conductance for the throttling valve.

39. The method as recited in claim 38 wherein operating the throttling valve further comprises using the flow coefficient to produce a level of electric current for operating the throttling valve.

40. The method as recited in claim 33 wherein operating the respective control valve assembly for a given hydraulic function comprises: in response to the respective function flow value and function load value for the given hydraulic function and in response to the function pressure value that is greatest, deriving a flow coefficient that specifies one of a flow restriction and a flow conductance for the given hydraulic function; and operating the respective control valve assembly in response to the flow coefficient.

41. The method as recited in claim 33 further comprising deriving a flow sharing value designating a relationship between a total amount of flow demanded by the plurality of hydraulic functions and an amount of flow available from the pump; and at least one of operating the bypass valve, operating the throttling valve, and operating the control valve assembly of each hydraulic function is also in response to the flow sharing value.

42. The method as recited in claim 33, wherein the pump has a displacement that varies in response to pressure applied to a control input; and further comprising applying pressure at the supply node to the control input.

* * * * *